(12) United States Patent
Ma et al.

(10) Patent No.: US 8,710,404 B2
(45) Date of Patent: Apr. 29, 2014

(54) METHOD AND APPARATUS TO MAINTAIN WELDING CURRENT TO COMPENSATE FOR DETERIORATION OF WELDING CONTACT TIP

(75) Inventors: Tiejun Ma, Tecumseh (CA); Robert D. Ryan, Belle River (CA)

(73) Assignee: Illinois Tool Works Inc., Glenview, IL (US)

( * ) Notice: Subject to any disclaimer, the term of this patent is extended or adjusted under 35 U.S.C. 154(b) by 120 days.

(21) Appl. No.: 13/419,492

(22) Filed: Mar. 14, 2012

(65) Prior Publication Data

US 2012/0234812 A1 Sep. 20, 2012

Related U.S. Application Data

(60) Provisional application No. 61/452,376, filed on Mar. 14, 2011.

(51) Int. Cl.
*B23K 9/10* (2006.01)

(52) U.S. Cl.
USPC .................................................. 219/130.21

(58) Field of Classification Search
USPC ........................... 219/130.21, 130.32, 130.33
See application file for complete search history.

(56) References Cited

U.S. PATENT DOCUMENTS

| 4,794,232 | A * | 12/1988 | Kimbrough et al. | 219/130.51 |
| 2003/0029851 | A1 * | 2/2003 | Suzuki et al. | 219/130.01 |
| 2006/0226131 | A1 | 10/2006 | Stava et al. | |

FOREIGN PATENT DOCUMENTS

| EP | 2199005 | 6/2010 |
| EP | 2210694 | 7/2010 |
| JP | 6198440 | 7/1994 |
| JP | 200024779 | 1/2000 |

OTHER PUBLICATIONS

International Search Report; PCT/US2012/028980; dated Jul. 4, 2012.
Written Opinion of the International Searching Authority; PCT/US2012/028980; dated Jul. 4, 2012.

* cited by examiner

*Primary Examiner* — Dana Ross
*Assistant Examiner* — Renee L Miller
(74) *Attorney, Agent, or Firm* — Fildes & Outland, P.C.

(57) ABSTRACT

A method of maintaining welding current to compensate for deterioration of a welding contact tip includes: monitoring in real time at least one of welding current and welding voltage during welding production; comparing the at least one of the welding current and the welding voltage to a reference value for a given set of parameters; and adjusting one or more welding parameters in real time to increase energy output in response to the comparison so that consistent energy is consumed across the welding arc, whereby the quality of the welding production is maintained as the welding contact tip is consumed.

18 Claims, 8 Drawing Sheets

METHOD AND APPARATUS TO MAINTAIN WELDING CURRENT TO COMPENSATE FOR DETERIORATION OF WELDING CONTACT TIP

CROSS REFERENCE TO RELATED APPLICATION

This application claims the priority of U.S. Provisional Application No. 61/452,376 filed Mar. 14, 2011.

TECHNICAL FIELD

This invention relates to contact tips for a welding torch, and more particularly to a method of compensating for deterioration of a contact tip in pulse gas metal arc welding (GMAW-P) applications.

BACKGROUND OF THE INVENTION

It is known in the art relating to GMAW that the life span of a contact tip in a pulse application is significantly shorter than in a conventional application (i.e., constant voltage (CV)). Pulse or GMAW-P as used herein refers to any power control method that deviates from a constant voltage method. A typical feature in a pulse waveform is high speed ramping of the welding current (or voltage) at a level of 0.5 to $3 \times 10^6$ Amp/sec or even higher. The deterioration of the contact tip in pulse applications may be quantified by measuring a decrease in the average welding current, an increase in the standard deviation of the welding current, and/or an increase in the average welding voltage.

The deterioration of the contact tip in pulse GMAW applications may be caused by damage to the interface between the contact tip and the electrode wire caused by mechanical wear, high temperature of the welding arc, joule heat from the electric conductivity, and possible micro-arcing during pulse peaks. The electrical resistance of the interface between the contact tip and the electrode wire increases as the contact tip is deteriorated.

When a standard power source control mechanism is used, the increased resistance of the contact tip/electrode wire interface results in a decrease in the energy consumption at the welding arc. If the energy consumption falls below a certain threshold value, a smooth arc cannot be maintained, resulting in welding defects.

SUMMARY OF THE INVENTION

The present invention provides a method and apparatus for maintaining welding energy consumption to compensate for the deterioration of a welding contact tip in robotic or automatic manufacturing processes that use GMAW-P applications such as pulse, modified pulse, modified short circuit, or similar, in which the welding setups are virtually fixed. The present invention automatically adjusts the output energy in accordance with the deterioration of the contact tip. For example, when a systematic decrease in the welding current is observed during production, in which all the parameters such as the program, the parts design, the gas, etc., are supposed to be kept constant, a conclusion is made that the contact tip has deteriorated. Based on this conclusion, the system automatically adjusts the energy output to the welding torch to mitigate the energy reduction due to the deterioration of the contact tip. The energy output may be increased by, but not limited to, increasing the width of the pulse, reducing the width of the background, increasing the peak or background current, physically moving the robot towards the weldment, adjusting the travel speed, adjusting the approach angle, and adjusting the wire feed speed. The increased energy output compensates for the deterioration of the contact tip, so that a consistent amount of energy is consumed across the welding arc. Thus, the quality of the welding is maintained, and the contact tip life is extended.

More particularly, a method of maintaining welding current to compensate for deterioration of a welding contact tip includes: monitoring in real time at least one of welding current and welding voltage during welding production; comparing the at least one of the welding current and the welding voltage to a reference value for a given set of parameters; and adjusting one or more welding parameters in real time to increase energy output in response to the comparison so that consistent energy is consumed across the welding arc, whereby the quality of the welding production is maintained as the welding contact tip is consumed.

Adjusting the welding parameters to increase energy output may include one of increasing the width of the pulse, reducing the width of the background, increasing background current, increasing peak current, and decreasing a distance between the contact tip and a weldment. Monitoring at least one of welding current and welding voltage may include measuring the welding current in real time; establishing an average welding current ($I_t$); and calculating a standard deviation ($\sigma_t$) of the welding current at time t. Comparing the welding current to a reference value may include comparing the average welding current and the standard deviation of the welding current with reference data for average welding current ($I_0$) and standard deviation of the welding current ($\sigma_0$) obtained from a new contact tip.

The method may further include: establishing a compensation factor, the compensation factor being a function of the monitored welding current and reference data; and applying the compensation factor to output a target welding current. The compensation factor ($\Delta I$) may be calculated according to the following equation (1): $\Delta I = (I_0 + 2\sigma_0) - (I_t + 2\sigma_t)$. The target welding current ($I_{targ}$) may be calculated according to the following equation (2): $I_{targ} = I_t + \Delta I$. The expression $2\sigma_0$ in Eq. 1 may be substituted with a value that is 10% of $I_0$ and the expression $2\sigma_t$ in Eq. 1 may be substituted with a value that is 10% of $I_t$. Alternatively, the expression $2\sigma_0$ in Eq. 1 may be substituted with a value that is 20 Amps greater than $I_0$ and the expression $2\sigma_t$ in Eq. 1 may be substituted with a value that is 20 Amps greater than $I_t$.

An apparatus to maintain welding current to compensate for deterioration of a welding contact tip includes a monitor for monitoring at least one of welding current and welding voltage during welding production, a comparator for comparing the at least one of the welding current and the welding voltage to a reference value for a given set of parameters, and a controller for automatically adjusting welding parameters in real time to increase energy output in response to the comparison of the comparator so that consistent energy is consumed across the welding arc, thereby maintaining the quality of the weld as the welding contact tip is consumed.

The controller may adjust the welding parameters to increase energy output by one of increasing the width of the pulse, reducing the width of the background, increasing background current, increasing peak current, and decreasing a distance between the contact tip and a weldment. The monitor may measure the welding current in real time, may establish an average welding current ($I_t$), and may calculate a standard deviation ($\sigma_t$) of the welding current at time t. The comparator may compare the average welding current and the standard deviation of the welding current with reference data for average welding current ($I_0$) and standard deviation of the welding current ($\sigma_0$) obtained from a new contact tip. The controller may establish a compensation factor that is a function of the monitored welding current and reference data, and the controller may apply the compensation factor to output a target welding current. The compensation factor ($\Delta I$) may be established according to the following equation (1): $\Delta I=(I_0+2\sigma_0)-(I_r+2\sigma_r)$. The target welding current ($I_{targ}$) may be established according to the following equation (2): $I_{targ}=I_r+\Delta I$. The expression $2\sigma_0$ in Eq. 1 may be substituted with a value that is 10% of $I_0$ and the expression $2\sigma_r$ in Eq. 1 may be substituted with a value that is 10% of $I_r$. Alternatively, the expression $2\sigma_0$ in Eq. 1 may be substituted with a value that is 20 Amps greater than $I_0$ and the expression $2\sigma_r$ in Eq. 1 may be substituted with a value that is 20 Amps greater than $I_r$.

These and other features and advantages of the invention will be more fully understood from the following detailed description of the invention taken together with the accompanying drawings.

DETAILED DESCRIPTION OF THE INVENTION

Figure 1:
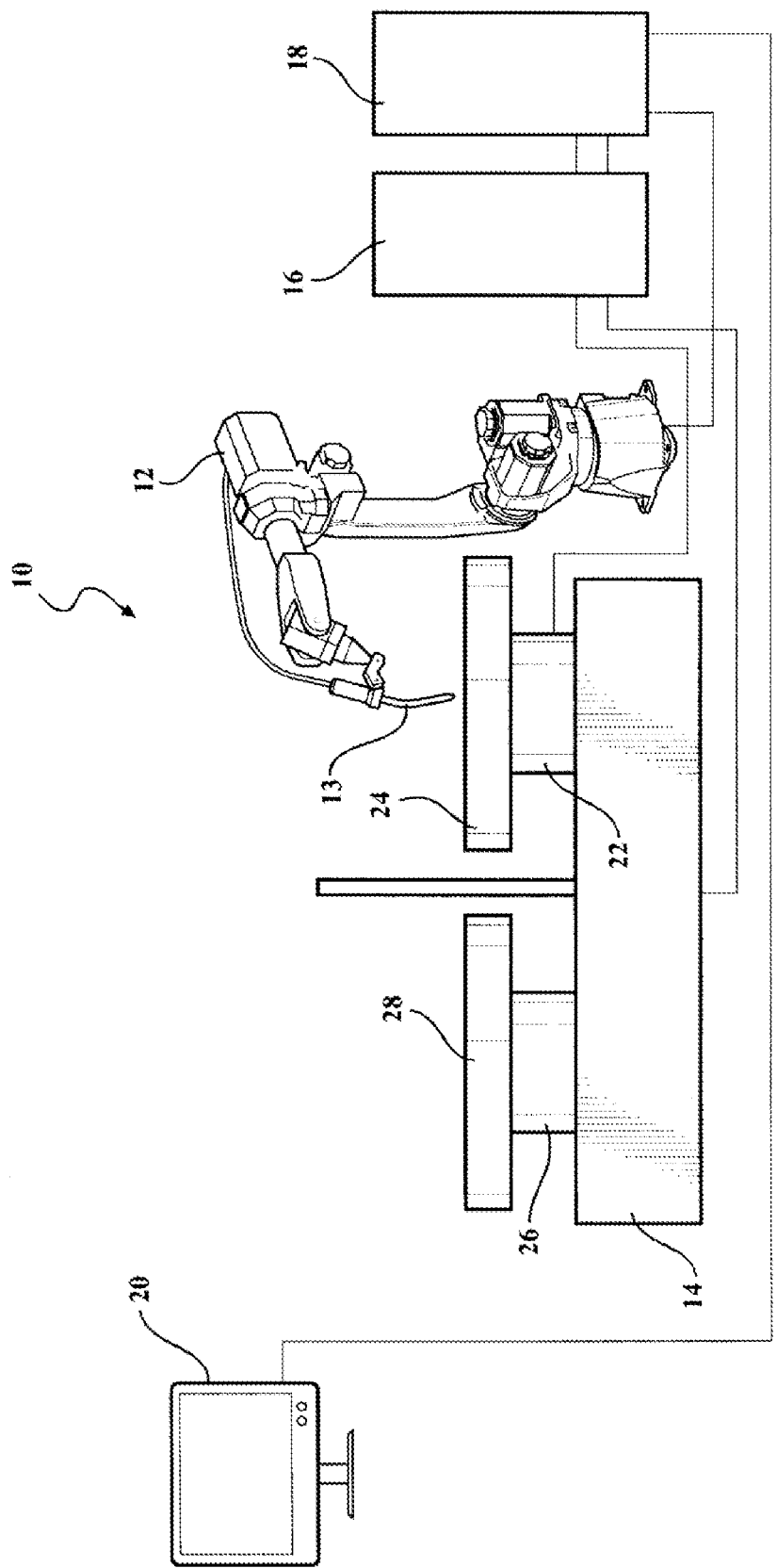
FIG. 1 is a schematic view of a robotic welding manufacturing cell.

Referring now to the drawings in detail, numeral 10 in FIG. 1 generally indicates a robotic welding manufacturing cell. The welding cell 10 generally includes a welding robot 12 including a welding torch 13, a turn table 14 disposed in a working relationship relative to the robot, a power source 16 connected to the robot, a robot controller 18 connected to the power source, the robot, and the turn table, and a manufacture line display and control (MLDC) 20. The turn table 14 may have two sides including an A-side 22 that holds a workpiece such as part 24 and a B-side 26 that holds a workpiece such as part 28. While part 24 is being welded by the robot 12, part 28 may be loaded/unloaded by a handling robot or a human operator.

The welding power source 16 and the robot controller 18 may be separate or may be integrated in one welding control system unit. In either case, the power source 16 and controller 18 include logic devices that directly or indirectly provide proper welding energy output and control the welding locations and sequences. A welding operator may set welding parameters through the robot controller 18, and these parameters are then de-coded and executed by the system. The MLDC 20 monitors and controls the welding performed in the cell 10, which includes managing the welding programs of the robot, part movement, fixture engagement, and safety, and displaying information indicating the status of the cell.

The MLDC 20 may also coordinate an entire manufacturing line having more than one welding cell. During production, the welding operator may monitor the MLDC 20 to obtain a status of the progress of the manufacturing process, and to troubleshoot and solve problems that halt production.

Most of the power sources currently used in automatic welding manufacturing lines are digital power sources having integrated data recording systems that allow for real-time acquisition of welding parameters including welding current, welding voltage, wire feeding speed, and the like. In the present invention, welding current and voltage are acquired and processed by the power source 16, or the robot controller 18, or an independent device such as the MLDC 20.

The welding torch 13 is equipped with a contact tip through which consumable electrode wire is fed during while the robot 12 welds workpieces. The energy output of the power source 16 is delivered through the welding torch 13 (including the contact tip) to the consumable electrode wire, creating a welding arc and joining workpieces. The contact tip itself is a consumable item and must be replaced periodically to maintain acceptable welding quality. Typically, contact tips changes are scheduled in two different ways: scheduled changes and reactive changes. For most automotive applications, for example, contact tips are changed at a scheduled time. For example, during a break time or at the end of a production shift, all the contact tips across the whole line may be changed, which is referred to as a "scheduled change." However, if a welding operator observes welding defects that are related to the contact tip wear, the welding cell or the line may be abruptly shut down to change the contact tip out-of-schedule, i.e., a reactive change.

Providing sufficient energy to the contact tip and welding arc is important to compensate for deterioration of the contact tip, thereby preventing welding defects and extending the useful life of the contact tip prior to replacement. The present invention provides a method and apparatus for maintaining welding energy consumption to compensate for the deterioration of a welding contact tip in the welding work cell 10.

Figure 2:
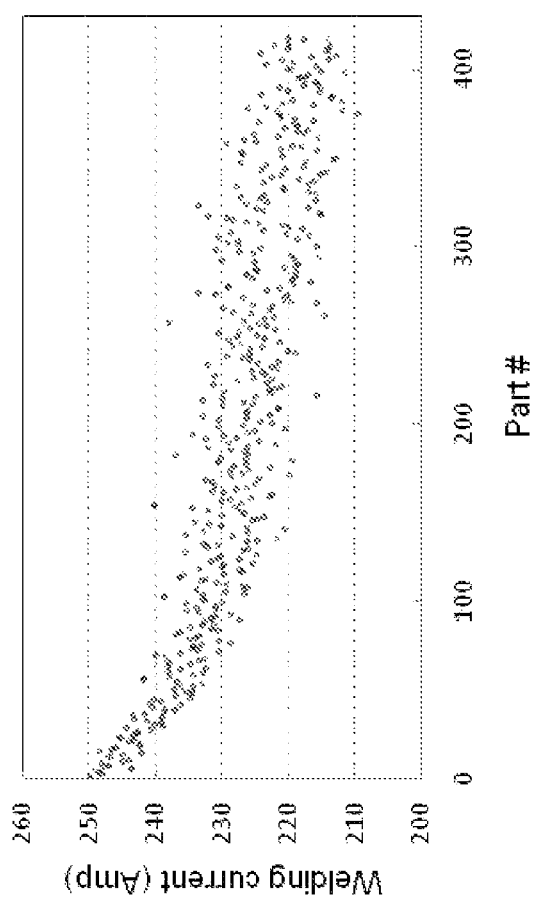
FIG. 2 is a graph of measured average welding current with respect to productivity (part count) for one contact tip in a mass production environment.

FIG. 2 graphically illustrates a typical set of average welding current values as a function of productivity (in terms of part count) for one contact tip through its lifespan in a mass production environment. Each data point in the graph represents the average welding current of a representative weld in one cycle (e.g., the production of one part). The data is collected at a frequency of 10 Hz or higher, so that a trustable average and standard deviation can be calculated. The welding data at the arc start (before reaching 95% of the average welding current) and arc stop (0.4 seconds before the 0 welding current) were removed as constituting insignificant noise. The graph shows that the average welding current has a decreasing trend over the entire lifespan of a contact tip, and that the average welding current values become increasingly more scattered (standard deviation of the average welding current values increases) as the contact tip is used. Thus, in a production environment, the deterioration of a contact tip can be determined by monitoring and analyzing welding parameters such as the average welding current, the voltage, and deviations (spread) of these parameters.

Figure 3:
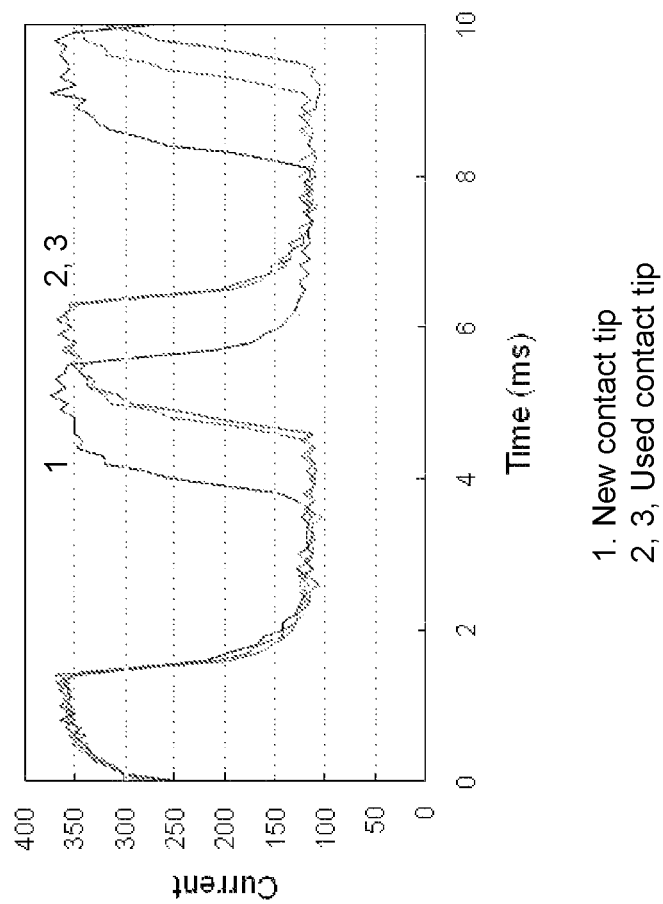
FIG. 3 is a graph of pulse waveforms for new and used contact tips at the same standard pulse setup.

FIG. 3 graphically illustrates typical pulse welding current waveforms for a new contact tip (waveform "1") and used contact tips (waveforms "2" and "3") at the same standard pulse setup. In pulse (i.e., GMAW-P) waveforms, the welding current periodically varies between certain values, including but not limited to the peak and background currents. The graph shows that the "shape" of the pulse peak, including the ramp up, the peak current, the width of the peak, the ramp down, and the background current, are generally the same for a new and a used contact tip. However, the width of the background current is greater for a used contact tip. As a result, the total energy (average welding current) is less for a used contact tip than a new contact tip. The mechanism behind the decrease in total energy is that the welding torch is designed to maintain a constant arc length at various contact tip to work distances (CTWDs). When the welding cell senses that the total resistance of the system has increased, the welding cell assumes that the stick-out of the electrode wire, or the CTWD, has increased. The welding cell then reduces the energy output to maintain the constant arc length, which is commonly referred to as "adaptive" technology. Increasing the length of the background current (which in turn reduces the pulse frequency) is the most common method of reducing the energy output to maintain the arc characteristics; however, other energy output reduction methods are available.

This energy output reduction mechanism is important in manual welding operations performed by a human operator, because the CTWD may vary from time to time due to the inconsistency of the operator. The mechanism is also important during welding setup procedures, in which welding operators must adjust the CTWD to obtain proper access and welding quality. In contrast, in automatic pulse GMAW (GMAW-P) applications, the CTWD can be maintained substantially constant. Therefore, the need to adjust the energy output based on the actual (rather than perceived) CTWD is low in automatic applications, which is important to the present invention as will be apparent from the following description.

Figure 4:
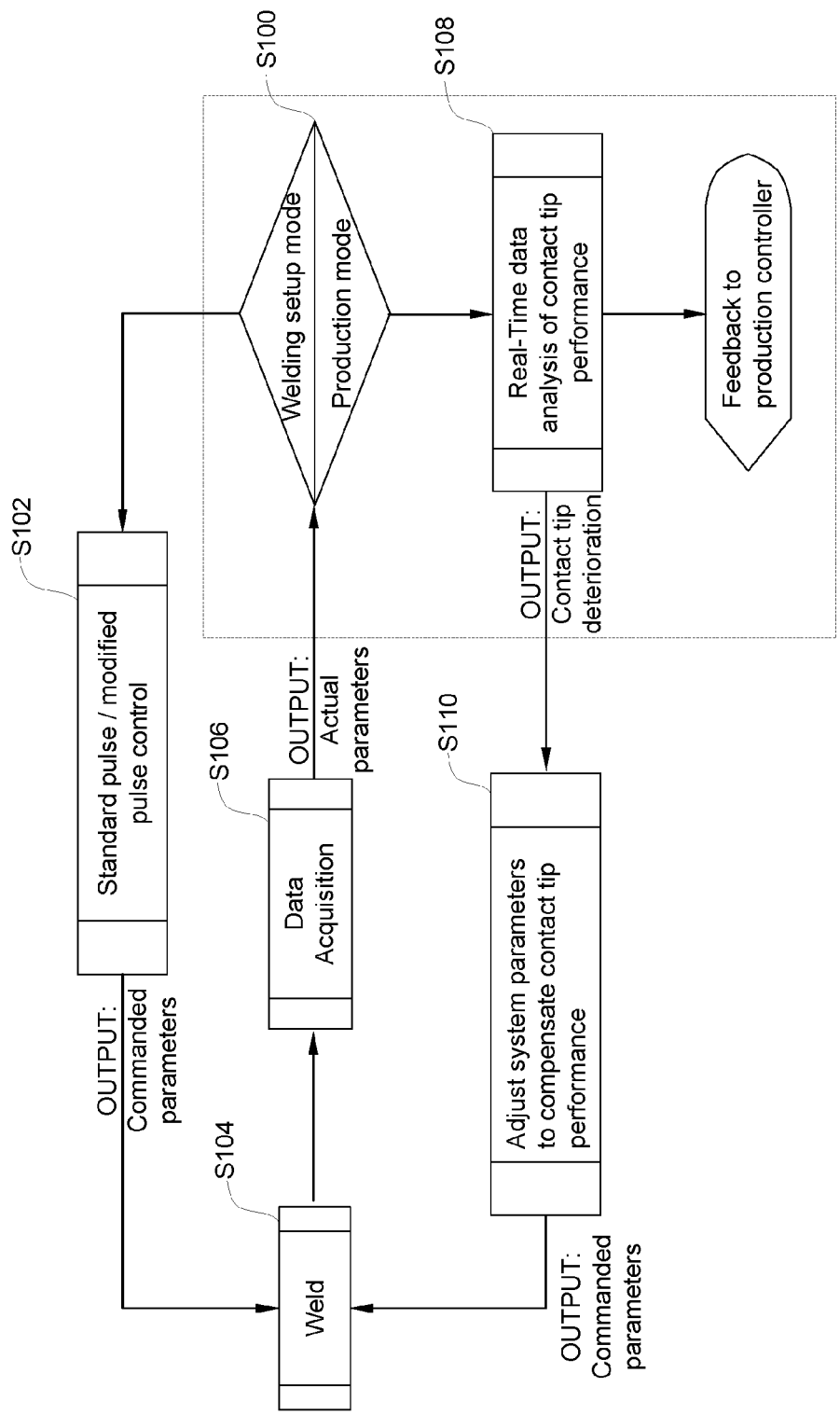
FIG. 4 is a flow chart including steps of a method of monitoring and compensating for contact tip deterioration in accordance with the present invention.

Turning to FIG. 4, in the present invention, at S100 a Boolean logic value, which may be set by a welding operator, determines whether a "welding setup mode" or a "production mode" is executed. In the case of the "welding setup mode," the standard GMAW-P mechanism described above is applied at S102. Specifically, the controller 18 (FIG. 1) considers variation of the CTWD as a high priority factor for energy output, and it correspondingly provides commanded welding parameters to the power source according to the mechanism described above in order to perform a weld operation at S104.

The Boolean logic value at S100 alternatively may default to the "production mode," and may only shift from the "production mode" by a manual over-ride by a welding operator for manual operation or any other non-production operation. An example of a non-production operation is a command executed through the teach panel of the robot controller. The Boolean logic value is reset manually or automatically to "production mode" when production is resumed, for example, on a command from an operator.

In the case of the "production mode," actual welding parameters such as the welding current and welding voltage are monitored in real-time at S106 by the controller or associated electronics during operation of the welding cell. The measured welding parameter data is analyzed in real-time, and a contact tip life index (such as described in U.S. Patent Application Pub. No. 2011/0073580) or other indicator of contact tip deterioration is calculated. For example, contact tip deterioration may be quantified by comparing the measured values of welding parameters such as the average welding current ($I_t$) and the standard deviation ($\sigma_t$) of the welding current acquired at S108 with stored reference values ($I_0$ and $\sigma_0$) for a new contact tip under a given set of parameters. The real time values ($I_t$, $\sigma_t$) and the stored reference values ($I_0$, $\sigma_0$) are used to calculate a compensation factor ($\Delta I$), which is automatically applied at S110 to adjust the system parameters to produce an output target welding current ($I_t+\Delta I$) that compensates for the deteriorated contact tip's performance. The controller 18 controls the power source 16 to output the target welding current to the welding torch 12 to complete a weld operation at S104. The actual welding parameters of this weld operation are measured at S106 and fed back to the controller 18 at S110 to continuously monitor and adjust the welding operation from cycle to cycle.

Figure 5:
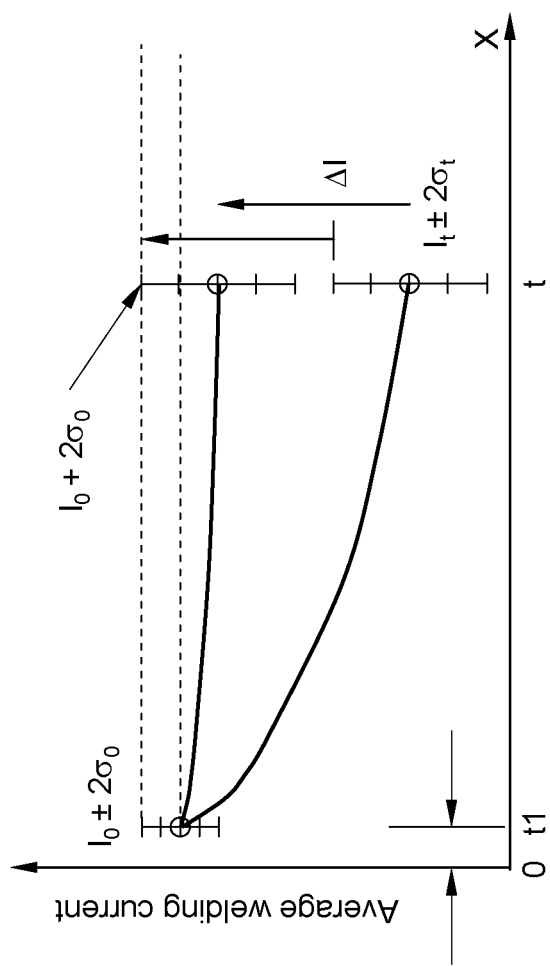
FIG. 5 is a graphical, schematic illustration of a calculation of a compensation factor in accordance with the present invention.

FIG. 5 graphically illustrates the calculation of the compensation factor ($\Delta I$). The X-axis is time (or some other time-related factor such as part count, electrode wire consumption, or similar). The Y-axis is the average welding current. The welding parameters (average welding current $I_0$, standard deviation of welding current $\sigma_0$ for a "new" contact tip under a given set of welding conditions are measured and stored in advance. For example, the average welding current $I_0$ and standard deviation of welding current $\sigma_0$ may be the measured values obtained by beginning with an unused contact tip and performing welding operations over the first 5 to 10 percent of the estimated life span of a typical contact tip ($t_1$). Alternatively, the "new contact tip" period may be set as 5 to 10 percent of one shift's (or one day's) production, as a certain number of parts made at production start-up, as a certain amount of electrode wire used, as a certain amount of accumulated arc-on time of the welding torch, or the like. The data for the "new contact tip" may also be obtained during the setup of the welding cell by a welding operator. No energy output compensation is applied during the "new contact tip" period (i.e., from time 0 to time $t_1$). A threshold is then set for the upper limit of the welding current ($I_u$). For example the upper limit $I_u$ may be set as the value of $I_0+2\sigma_0$, in other words two standard deviations above the new contact tip average welding current. However, the upper limit $I_u$ threshold may be set as a certain amperage value or percentage above the value of $I_0$. Next, production is begun, and at a time t which is later than time $t_1$ the actual operating welding parameters $I_t$ and $\sigma_t$ are measured and calculated, which as previously shown in FIG. 2, will be respectively less than and greater than the reference values $I_0$ and $\sigma_0$. Next, the compensation factor ($\Delta I$) is calculated. In calculating the compensation factor, the goal is to reasonably maintain the average welding current within the upper limit $I_u$. A threshold of $2\sigma_t$ assures that 95.5% of the actual welding current is below the upper limit. Thus, the compensation factor ($\Delta I$) is calculated according to the following equation:

$$\Delta I = (I_0+2\sigma_0)-(I_t+2\sigma_t) \quad \text{(Eq. 1)}$$

However, the factor of 2 in the $2\sigma_t$ threshold may be adjusted according to the characteristics of the welds and the quality control requirements of the welding cell. Alternatively, instead of calculating a value for the standard deviation of the welding current and determining whether to use a factor of 2 or an adjusted factor, the values of $2\sigma_0$ and $2\sigma_t$ may be replaced with equivalent thresholds and parameters. For example, the expression $2\sigma_0$ in Eq. 1 may be substituted with a value that is 10% of $I_0$ (i.e., the expression $0.10\ I_0$ may be substituted for $2\sigma_0$) and the expression $2\sigma_t$ in Eq. 1 may be substituted with a value that is 10% of $I_t$ (i.e., the expression $0.10\ I_t$ may be substituted for $2\sigma_t$). In another example, the expression $2\sigma_0$ in Eq. 1 may be substituted with a value that is 20 Amps greater than $I_0$ (i.e., the expression $I_0+20$ may be substituted for $2\sigma_0$ and the expression $2\sigma_t$ in Eq. 1 may be substituted with a value that is 20 Amps greater than $I_t$ (i.e., the expression $I_t+20$ may be substituted for $2\sigma_t$). Next, the target welding current output ($I_{targ}$) to be supplied to the welding torch is calculated according to the following equation $$I_{targ} = I_t + \Delta I \quad \text{(Eq. 2)}$$

The welding current output ("energy output") to the welding torch may be increased by the controller to the target output value $I_{targ}$ in a variety of ways, including but not limited to increasing the width of the pulse, reducing the width of the background in the pulse waveform, increasing the peak current, increasing the background current, physically moving the robot towards the welding workpiece target ("weldment"), or similar.

Figure 6B:
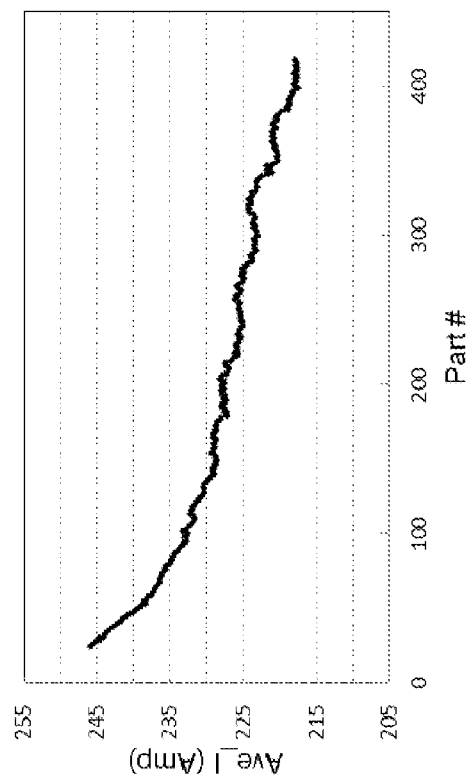
FIGS. 6a-f are graphs illustrating a method of monitoring and compensating for contact tip deterioration in accordance with the present invention.
Figure 6A:
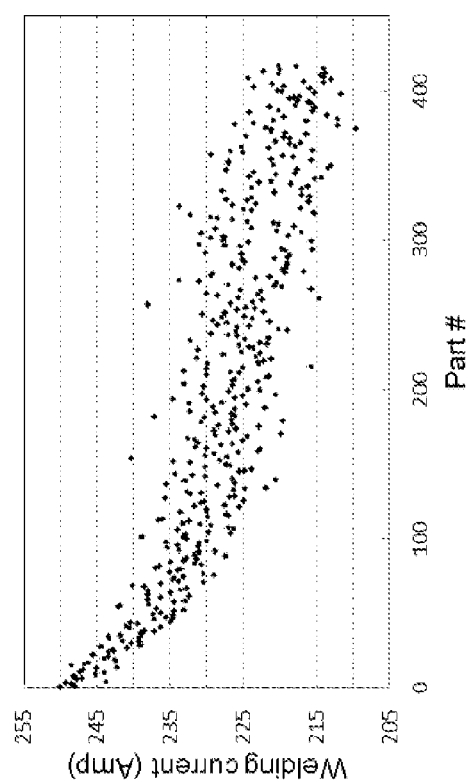
Figure 6D:
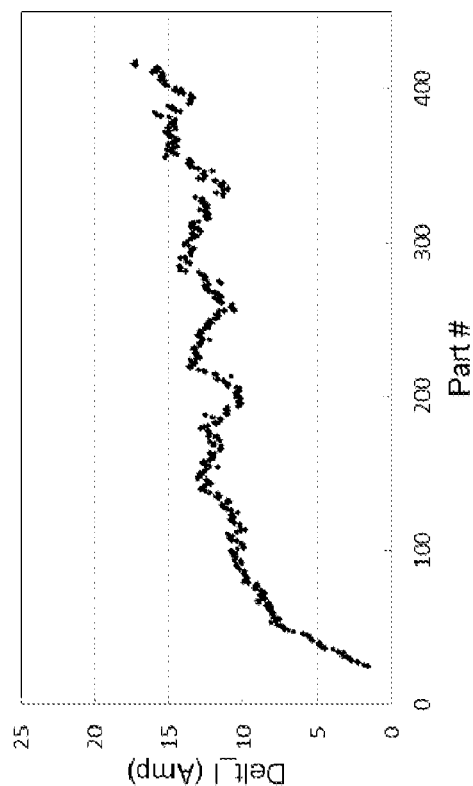
Figure 6C:
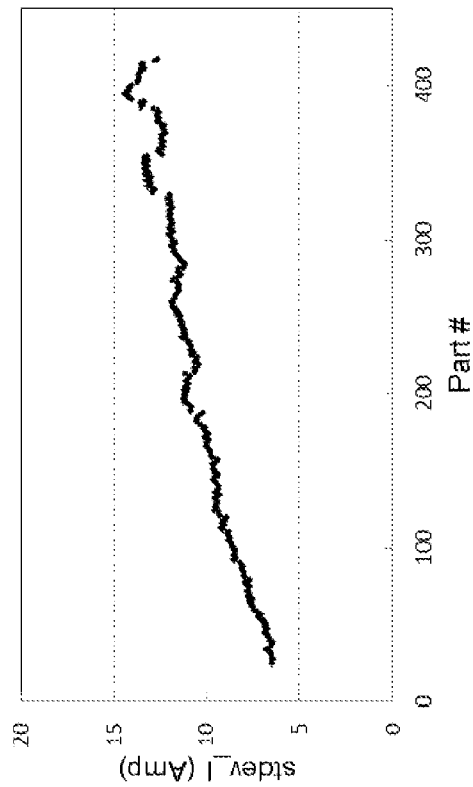
Figure 6E:
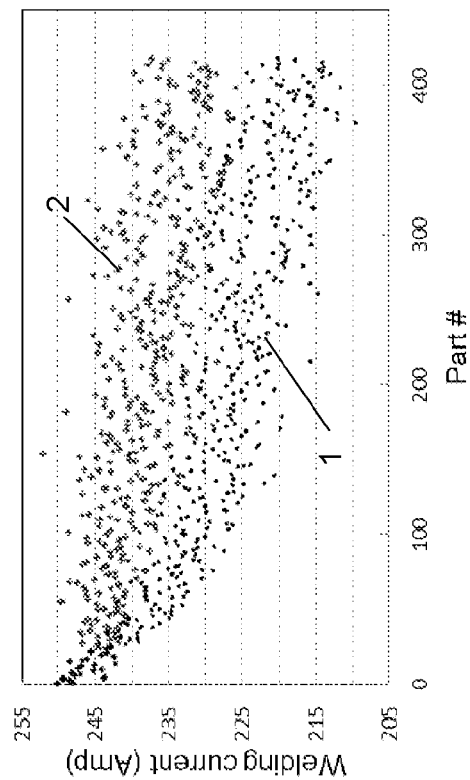
Figure 6F:
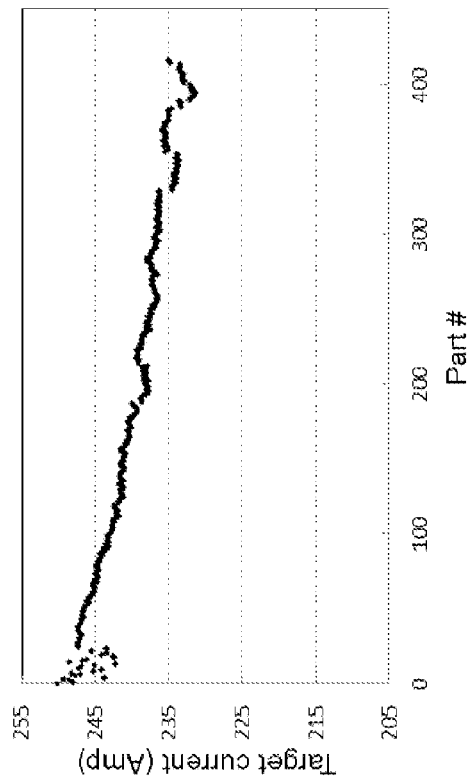

FIGS. 6a-f further graphically illustrate an example of the compensation process. FIG. 6a is a graph of the actual average welding current for every part welded in a welding cell, without welding current compensation. In FIG. 6b, the welding current has been averaged for every 25 part count, giving a smooth trend line (i.e., mean value) of the data shown in FIG. 6a. This curve also represents the original target output that the welding controller used according to the change in the electric resistance of the welding loop. FIG. 6c depicts the average standard deviation of the welding current, processed in the same manner as the data in FIG. 6b (i.e., for every 25 part count). The "new contact tip" data ($I_0$, G) are obtained at the beginning (the first 25 parts) of the graphs in FIGS. 6b, 6c. These values correspond to 6% of one shift of production, which totals 400 parts. At any moment t (i.e., at any part count), the welding data ($I_t$, $\sigma_t$) is obtained from FIGS. 6b, 6c. Using this data, the compensation factor ($\Delta I$) is calculated using Eq. 1 above. The result of these calculations is shown in FIG. 6d. Correspondingly, the target output ($I_{targ}$) is calculated using Eq. 2 above. The result of these calculations is shown in FIG. 6e. A comparison of the new target output shown in FIG. 6e with the original target output shown in FIG. 6b reveals that the new target output is higher than the original output target by a value of the compensation factor shown in FIG. 6d. FIG. 6f depicts the expected welding current ("2") as cross symbols compared to the original observed welding current ("1") as dot symbols. As can be seen from the graph, the drop in the average welding current across the 400 part count (one production shift using one contact tip) is significantly reduced when the compensation factor is employed. This reduction in the decrease of the welding current results in better consistency of the welding quality as the contact tip is consumed during production, reduces the occurrence of welding defects, and extends the life of the contact tip in pulse applications.

While the method has been described in relation to the average welding current and standard deviation of welding current, the method may be similarly applied using the average welding voltage and standard deviation of welding voltage. Likewise, the compensation factor may be an increment of the average welding voltage rather than an increment of the average welding current.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A method of maintaining welding current to compensate for deterioration of a welding contact tip, the method comprising the steps of:
   monitoring in real time at least one of welding current and welding voltage during welding production throughout the lifespan of the welding contact tip;
   comparing the at least one of the welding current and the welding voltage to a reference value for a given set of parameters; and
   adjusting one or more welding parameters in real time to increase energy output in response to the comparison so that consistent energy is consumed across the welding arc as the welding contact tip deteriorates;
   whereby the quality of the welding production is maintained as the welding contact tip is consumed.

2. The method of claim 1, wherein adjusting the welding parameters to increase energy output includes one of increasing pulse width, reducing background width, increasing background current, increasing peak current, and decreasing a distance between the contact tip and a weldment.

3. The method of claim 1, wherein monitoring at least one of welding current and welding voltage includes:
   measuring the welding current in real time at a frequency of 10 Hz and 40 Hz;
   establishing an average welding current ($I_t$); and
   calculating a standard deviation ($\sigma_t$) of the welding current.

4. The method of claim 3, wherein comparing the welding current to a reference value includes:
   comparing the average welding current and the standard deviation of the welding current with reference data for average welding current ($I_0$) and standard deviation of the welding current ($\sigma_0$) obtained from a new contact tip.

5. The method of claim 4, including the steps of establishing a compensation factor, wherein the compensation factor is a function of the monitored welding current and reference data; and
   applying the compensation factor to output a target welding current.

6. The method of claim 5, wherein the compensation factor ($\Delta I$) is calculated according to the following equation:

$$\Delta I = (I_0 + 2\sigma_0) - (I_t + 2\sigma_t) \quad \text{(Eq. 1)}$$

7. The method of claim 6, wherein the target welding current ($I_{targ}$) is calculated according to the following equation:

$$I_{targ} = I_t + \Delta I \quad \text{(Eq. 2)}$$

8. The method of claim 6, wherein $2\sigma_0$ in Eq. 1 is substituted with a value that is 10% of $I_0$ and $2\sigma_t$ in Eq. 1 is substituted with a value that is 10% of $I_t$.

9. The method of claim 6, wherein $2\sigma_0$ in Eq. 1 is substituted with a value that is 20 Amps greater than $I_0$ and $2\sigma_t$ in Eq. 1 is substituted with a value that is 20 Amps greater than $I_t$.

10. An apparatus to maintain welding current to compensate for deterioration of a welding contact tip according to the method of claim 1, the apparatus comprising:
    a monitor for monitoring at least one of welding current and welding voltage during welding production throughout the lifespan of the welding contact tip;
    a comparator for comparing the at least one of the welding current and the welding voltage to a reference value for a given set of parameters;
    a controller for automatically adjusting welding parameters in real time to increase energy output in response to the comparison of the comparator so that consistent energy is consumed across the welding arc as the welding contact tip deteriorates, thereby maintaining the quality of the weld as the welding contact tip is consumed.

11. The apparatus of claim 10, wherein the controller adjusts the welding parameters to increase energy output by one of increasing pulse width, reducing background width, increasing background current, increasing peak current, and decreasing a distance between the contact tip and a weldment.

12. The apparatus of claim 10, wherein the monitor measures the welding current in real time, establishes an average welding current ($I_t$), and calculates a standard deviation ($\sigma_t$) of the welding current.

13. The apparatus of claim 12, wherein the comparator compares the average welding current and the standard deviation of the welding current with reference data for average welding current ($I_0$) and standard deviation of the welding current ($\sigma_0$) obtained from a new contact tip.

14. The apparatus of claim 13, wherein the controller establishes a compensation factor that is a function of the monitored welding current and reference data, and the controller applies the compensation factor to output a target welding current.

15. The apparatus of claim 14, wherein the compensation factor ($\Delta I$) is established according to the following equation:

$$\Delta I = (I_0 + 2\sigma_0) - (I_t + 2\sigma_t) \qquad \text{(Eq. 1)}$$

16. The apparatus of claim 15, wherein the target welding current ($I_{targ}$) is established according to the following equation:

$$I_{targ} = I_t + \Delta I \qquad \text{(Eq. 2)}$$

17. The apparatus of claim 15, wherein $2\sigma_0$ in Eq. 1 is substituted with a value that is 10% of $I_0$ and $2\sigma_t$ in Eq. 1 is substituted with a value that is 10% of $I_t$.

18. The method of claim 15, wherein $2\sigma_0$ in Eq. 1 is substituted with a value that is 20 Amps greater than $I_0$ and $2\sigma_t$ in Eq. 1 is substituted with a value that is 20 Amps greater than $I_t$.

\* \* \* \* \*